United States Patent
Bowdish et al.

(10) Patent No.: US 9,388,944 B2
(45) Date of Patent: *Jul. 12, 2016

(54) CONTROLLED ENVIRONMENT EXPANDER

(71) Applicants: Boyd Bowdish, Los Gatos, CA (US); John Hammerman, Bozeman, MT (US)

(72) Inventors: Boyd Bowdish, Los Gatos, CA (US); John Hammerman, Bozeman, MT (US)

(73) Assignee: REFLECT SCIENTIFIC INC., Orem, UT (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/872,038

(22) Filed: Apr. 26, 2013

(65) Prior Publication Data
US 2014/0202176 A1  Jul. 24, 2014

Related U.S. Application Data

(63) Continuation-in-part of application No. 12/464,701, filed on May 12, 2009, now abandoned, and a continuation of application No. 12/574,670, filed on Oct. 6, 2009, now Pat. No. 8,448,454.

(51) Int. Cl.
| | |
|---|---|
| *F17C 11/00* | (2006.01) |
| *F17C 9/02* | (2006.01) |
| *F17C 13/00* | (2006.01) |
| *F25D 25/00* | (2006.01) |
| *F17C 7/04* | (2006.01) |

(52) U.S. Cl.
CPC .......................... *F17C 7/04* (2013.01)

(58) Field of Classification Search
CPC ........................................... F17C 7/04
USPC ............... 62/50.2, 50.7, 46.1, 52.1, 62
See application file for complete search history.

(56) References Cited

U.S. PATENT DOCUMENTS

| | | | | |
|---|---|---|---|---|
| 4,072,024 | A * | 2/1978 | Higgins | 62/48.2 |
| 4,365,978 | A * | 12/1982 | Scott | 95/255 |
| 5,729,983 | A * | 3/1998 | Garrett et al. | 62/46.1 |
| 5,842,783 | A * | 12/1998 | Boasso et al. | 366/101 |
| 6,044,648 | A * | 4/2000 | Rode | 62/62 |
| 6,112,529 | A * | 9/2000 | Curbow et al. | 62/50.2 |
| 6,332,325 | B1 * | 12/2001 | Monfort | 62/62 |
| 6,345,509 | B1 * | 2/2002 | Garlov et al. | 62/62 |
| 6,349,546 | B1 * | 2/2002 | Yoo | 62/50.2 |
| 6,732,544 | B1 * | 5/2004 | Taraboletti et al. | 62/642 |
| 2006/0183064 | A1 * | 8/2006 | Rost et al. | 431/11 |
| 2007/0022760 | A1 * | 2/2007 | Billman | 62/50.2 |
| 2009/0230025 | A1 * | 9/2009 | Argo et al. | 208/187 |

* cited by examiner

*Primary Examiner* — Henry Crenshaw
(74) *Attorney, Agent, or Firm* — Tran & Associates

(57) ABSTRACT

Systems and methods are disclosed that expand environmental support for an HVAC system with an HVAC fluid circulating throughout by vaporizing a cryogen; and sparging the vaporized cryogen to dispense sparge bubbles to the HVAC fluid to cool the HVAC fluid.

16 Claims, 5 Drawing Sheets

CONTROLLED ENVIRONMENT EXPANDER

This application is a continuation of U.S. application Ser. No. 12/574,670, filed Oct. 6, 2009, which in turn is a continuation-in-part application of U.S. application Ser. No. 12/464,701, filed May 12, 2009, the content of which is incorporated by reference.

The present invention relates to an environment expander for a facility.

BACKGROUND OF THE INVENTION

In many industries, including telecommunications, information storage and exchange industries, there is an increasing need for reliable cooling of manufacturing equipment and data centers with racks of servers. A failure of the manufacturing equipment can lead to costly plant shutdown, while a failure in cooling equipment can lead to failures in the servers, which can mean downtime for mission critical software and hardware failure for customer web application software. These facilities may need to support a temperature range from room temperature (25 degrees C.) down to a cryogenic temperature as low as −150 degrees C.

As businesses grow and expand, facility power services are being pushed to their design limits where all available electrical service is consumed for manufacturing, operations and production. With increases in manufacturing or service activity, tremendous heat is generated inside the facility. The heat needs to be effectively removed without diverting electrical power from existing manufacturing and operational activities.

A continuing need exists for improved air conditioning systems for buildings, particularly large, multi-room and multi-level buildings, e.g., schools, office buildings, hospitals and sports facilities, such as arenas. A variety of air conditioning systems have been proposed and developed, including those described in earlier patents identified on the cover page of this patent. Persons skilled in the art have recognized various challenges in designing systems that can be used to control the inside air temperatures in common areas and different rooms of those buildings. However, installing air conditioning systems and the components of air conditioning systems presents challenges as well. Installing an air conditioning system is not as simple as it might appear, particularly when the air conditioning system is associated with a building that has numerous rooms, each requiring individual temperature control. Installing air conditioning systems for large buildings and building systems is often highly complex, requiring the selection and coordination of air conditioning equipment, control systems, electrical switchgear, building materials and supplies, and also organizing the various subcontractors and construction workers, and securing building permits, etc.

US Patent Application 20040016245 discloses a packaged chilling system for providing chilled water to an air conditioning system for a building where a prepackaged water chilling system is installed at a location proximate to the building, and is operationally connected to the air handling system; and the water chilling system includes a moveable support structure comprising a support base on which a plurality of water chilling system components are affixed, the components including at least one water chiller for lowering the temperature of water from a high temperature to a low temperature. While moveable, such prepackaged chilling system is still expensive and complex to install.

SUMMARY

Systems and methods are disclosed that expand environmental support for an HVAC (heating, ventilating, and air conditioning) system with an HVAC fluid circulating throughout by vaporizing a cryogen; and sparging the vaporized cryogen to dispense sparge bubbles to the HVAC fluid to cool the HVAC fluid.

Implementations of the above aspect may include one or more of the following. The use of a cryogenic element to remove heat can be used to supplement a typical HVAC system as a controlled environment expander. The expander can include a vaporizer and sparging unit. Latent heat from a liquid used in a vapor-compression or absorption refrigeration system is accomplished using the expander. The expander can include a Liquid Bulk Tank, vacuum insulated piping, a vaporizer, and/or a sparging unit. The expander uses both the vaporizer and sparging unit to maximize the heat transfer from the HVAC liquid bath. The sparging unit can be located upstream of the vaporizer. The sparging unit can be a multi tube apparatus that flows a cryogenic element though a liquid bath. The vaporizer and sparging unit can be installed in the liquid bath of a vapor-compression or absorption refrigeration system. The expander can be controlled via a signal from the existing HVAC system and will be operated only during predetermined high load times. A gate can be provided for the expander to control the flow of cryogen into the expander. Gates such as vaporizer temperature, return air temperature of the existing HVAC system, LN2 pressure, among others can be used. The cryogen flow can be from either a dedicated bulk supply or a downstream use of a cryogenic element. The expander can have an automatic defrost cycle to maximize liquid flow through the vaporizer.

Advantages of the preferred embodiments may include one or more of the following. The system provides a cost effective way to expand services without expensive plant expansions. Existing equipment is better leveraged to support additional manufacturing load. This is done without requiring new capital improvement expenses. By recycling or tapping into the inherent cryogenic process component, the cryogenic process supports increased cooling capability from existing cooling equipment. The system simply injects cryogenic gas to provided controlled environmental expansion with minimal external power, and with a process only dependent on its inherent constituent components for operation, system reliability is improved. The system may also be used to expand environmental cooling capacity to accommodate growth in demand for industrial processes such as chemical plants, automotive plants, textile mills, paper mills, computer cooling, and factory air-conditioning. The expander can be used in differing applications. The expander is considered to be an environmentally responsible solution to controlled environment facilitation. The expander can reduce the overall electrical consumption of a facility by up to 144 KW/hour in one example. In one embodiment, the system can provide up to 55,000 BTU of potential energy removal to the vapor-compression or absorption refrigeration system. This new approach is a part of an environmentally responsible solution to large scale controlled environment engineering. The expander adds significant enthalpy to the HVAC system at peak demand times without diverting electrical service to the facility. This effort will significantly reduce the so-called carbon footprint of the facility while facilitating the required increase in manufacturing within the facility.

DESCRIPTION

Figure 1:
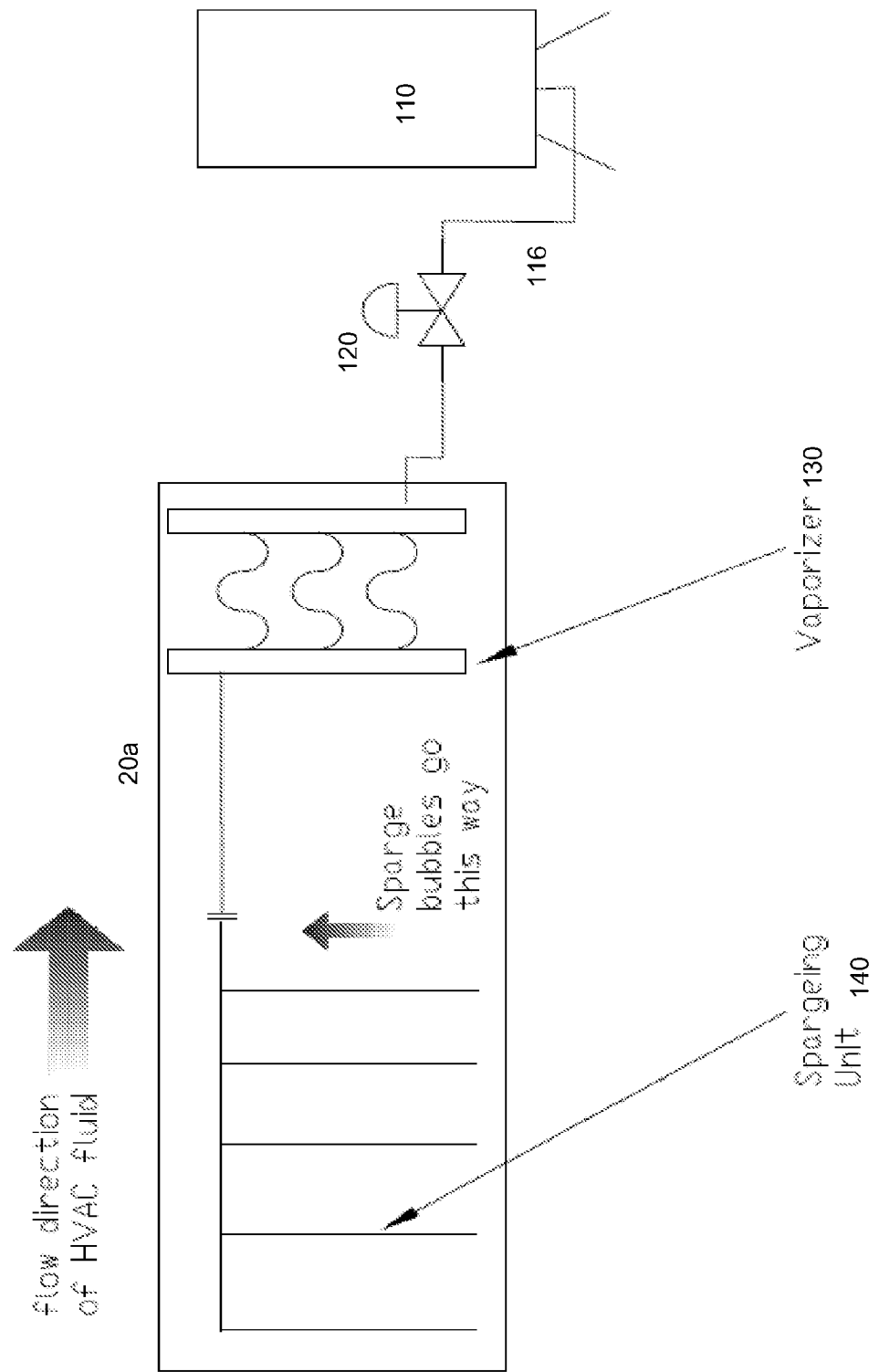
FIG. 1 shows a schematic diagram of an exemplary environment expander.
Figure 2A:
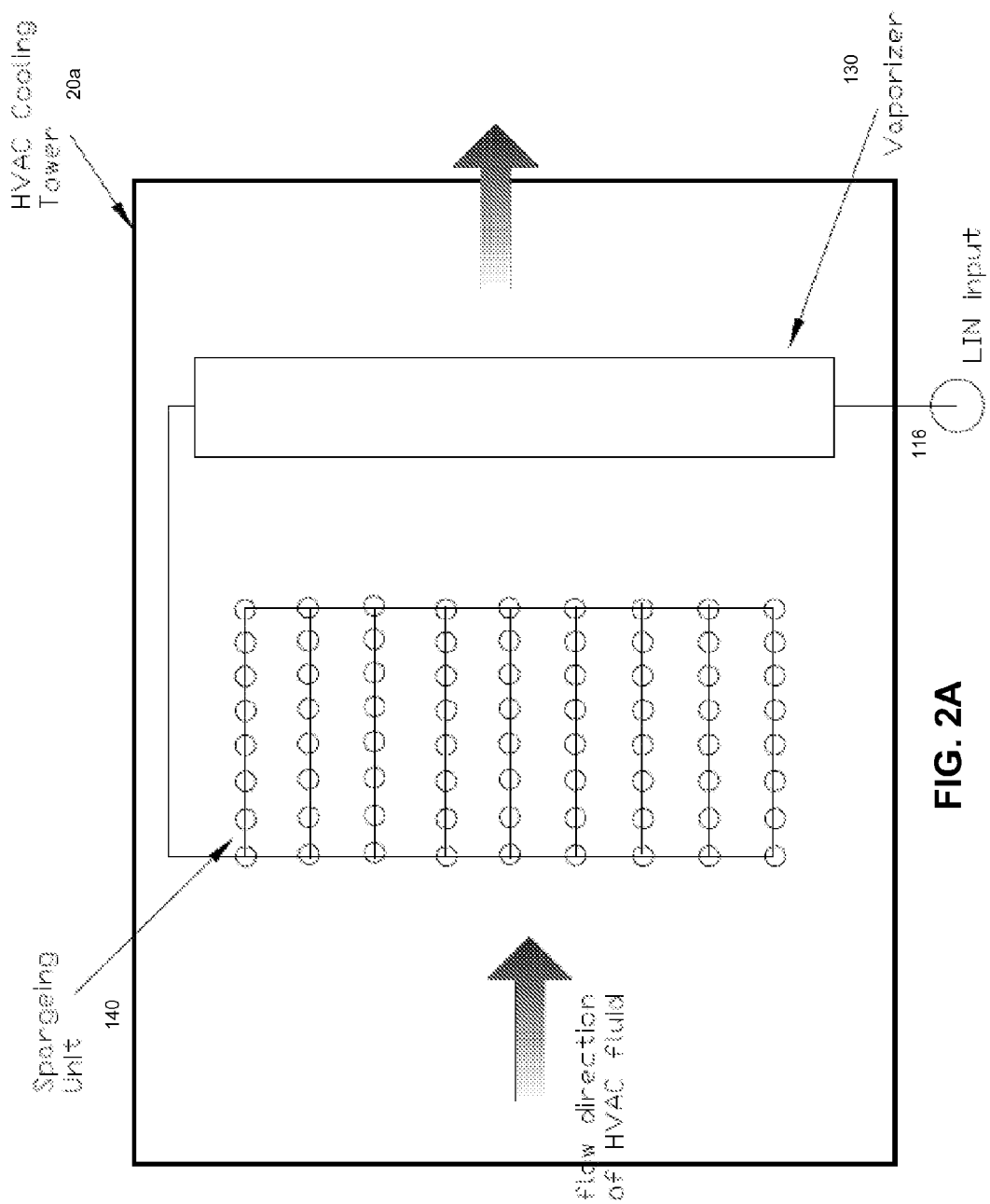
FIG. 2A shows another schematic diagram of an exemplary environment expander.

FIGS. 1 and 2A show schematic diagrams of an exemplary environment expander 20a. Referring to FIGS. 1 and 2A, the expander 20a is placed to receive heating, ventilation, and air conditioning (HVAC) fluid and to provide suitable cooling prior to delivering the fluid to an HVAC system such as an air conditioner, for example. The expander 20a includes a cryogenic liquid bulk tank container 110, liquid transfer line 116, vaporizer 130, sparging unit 140 and associated controls.

The expander 20a receives cryogen from the cryogenic tank container 110. The cryogen travels through a valve 120 and is provided to a vaporizer 130. The expander 20a includes a sparging unit 140 which sparges bubbles that float from the floor to the ceiling of the expander 20a. The output of the sparging unit 140 cools the HVAC fluid.

As best shown in FIG. 2A, a cryogen is received at an input 132 and travels to the vaporizer 130 and then is provided to the sparging unit 140 which provides a mist of cryogen to cool the HVAC fluid.

The vaporizer 130 is inserted into the HVAC cooling tower liquid bath. Cryogenic liquid is flowed into the vaporizer 130. The energy required to vaporize the cryogen will remove thermal energy from the HVAC liquid. The exhaust of the vaporizer 130 will feed into the sparging unit 140 which is located upstream of the vaporizer 130 and is also fully inserted into the liquid bath to fully realize the sensible heat of the cryogen.

The bulk tank 110 will be sized according to local delivery terms, but the system may consume up to 100 gallons of liquid cryogen per hour. A 5000 gallon tank may handle 50 hours of peak operation. Liquid consumption will be based on operating conditions and heat load demand from the facility interior heat load. The liquid transfer lines 116 are sized according to demand, but in most instances 1.0 inch internal diameter will be sufficient. The supply line 116 can be a vacuum insulated piping (VIP) line to minimize the vaporization of the cryogens during the transfer of the cryogenic liquids due to heat gain and vaporization. With vacuum insulated piping, the vacuum insulation decreases heat gain caused from conduction, convection, or radiation. In one embodiment, a multi-layer insulation is demonstrably superior to conventional foam insulated copper piping in reducing heat gain to the transferred cryogenic flow.

Fittings for input and output connection to the air heat exchanger air conditioning and or refrigeration source are configured and welded or bayoneted with cryogenic connectors in place. Preferably, the connection between the vacuum insulated pipes is done with a bayonet connector that uses thermal contraction/expansion mechanisms. The contraction/expansion provides a mechanical connection for sections of vacuum insulated pipe with a low heat gain connection. The bayonets are constructed of stainless steel with the nose piece of the male bayonet being made from a dissimilar material such as the polymer INVAR36 to prevent mechanical seizing. A secondary o-ring seal is used at the flange of each bayonet half to provide a seal in which a gas trap is formed between the close tolerance fitting sections of the bayonet assembly. This gas trap is formed using the initial cryogen flow which is vaporized and forms high pressure impedance for the lower pressure liquid, thus forming a frost free connection with lowered heat gain to the cryogenic flow.

A manual shut-off valve 120 can be connected to the supply line 126 to allow a user to shut-off the system in case of an emergency. The LN2 liquid can pass through a redundant valve and enters another valved supply line 112. The supply line 112 has a relief valve 114 and is gated by a control valve. In one embodiment, a VIP control valve set up is provided with a redundant safety valve. The safety valve is of the EMO (emergency machine off) type, closed with power removed. The LN2 liquid then travels through a distributor which evenly controls the flow of the cryogenic element over a plurality of lead tubes. The lead tubes then complete the enthalpy control to the vaporizer 130 such as the Multi Tube Hi Reliability Tubing discussed in U.S. Pat. No. 6,804,976, the content of which is incorporated by reference.

The vaporizer 130 can be a multiple pass finned heat exchanger with stainless steel fins and tubes. In one embodiment, the vaporizer 130 can have the following approximate specifications:

Coil 5 rows deep and 20 rows high and 72 inches long
0.75 inch I.D. tubing
Fins are to be 0.055 inch thick aluminum, 2.5 inch square on a 8 fins per inch density
One circuit, inlet on the bottom, exit on the top The sparging unit 140 is constructed of several rows of tubing in a grid pattern with each tube exit point being at the bottom of the liquid bath. The cryogenic element flow will be in a parallel fashion, introducing equal amounts of cryogen to all tubes. The sparging unit 140 then deploys the cryogen into the liquid bath, energy is removed from the liquid bath as the gaseous cryogen is flowed through the liquid bath. The cryogen, being lighter than air, rises through the bath, and is released into the atmosphere off of the surface of the liquid bath.

The liquid cryogen will be proportionally flow controlled into the vaporizer based on real time expander data. Cryogen flow will be based on the liquid bath temperature and the main HVAC load. Gating data will be the temperature of the vaporizer and the temperature of the return air to the main HVAC system. Setpoint limits will be configured so that when the in return air temperature reaches a setpoint, the cryogen flow is started. Vaporizer temperature will be monitored and will engage a defrost cycle.

The expander 20a supplements the existing HVAC system during peak load periods. Through the use of an inert cryogenic element, the natural fluid dynamics of the cryogen are used to pump the cryogenic element through the system without the need for additional electrical service. The gaseous, non-polluting exhaust element is released back to the atmosphere as a non-polluting gas. With the vaporizer 130 and sparging unit 140 used, the system takes full advantage of both the latent heat of vaporization and the sensible heat transfer of the cryogenic element. The removal of latent heat in the liquid of such HVAC systems allows existing installations to remain intact, eliminating the need to expand these systems to accommodate new facility challenges and/or business growth. The system performs expanded environmental control task with a minimum of electrical service requirements from the facility.

In one embodiment, the expander 20a is to be used by networking companies and network component manufacturing facilities. The need to increase the size of data centers puts demands on all available electrical service to be allocated to computing servers and networking equipment. These servers and data centers produce tremendous amounts of ambient heat within the data center. This ambient heat is removed using conventional HVAC techniques.

In one embodiment, the expander 20a is located on the roof within the cooling tower liquid bath. A dedicated liquid bulk tank 110 is located next to the building with vacuum insulated piping 116 transferring the cryogen to the expander 20a.

In another embodiment, the expander 20a is used by facilities that are currently engaged in a cryogenic process. These facilities belong in the life sciences, medical production, biopharmaceutical research and manufacturing, food and beverage or semiconductor industries. In this embodiment, the cryogenic element is introduced to the facility HVAC after the primary use of the cryogenic element. The overall net effect will be lower due to the already spent energy of the primary cryogenic process, but the addition of the expander 20a will maximize the total available enthalpy of the cryogenic element, which is purchased for the primary cryogenic process. This embodiment is viewed as an environmentally responsible approach towards maximizing operating efficiencies of the cryogenic process whilst decreasing the potential carbon footprint of the facility.

In one example, the system is capable of delivering up to 55K BTUs of enthalpic potential to the HVAC liquid bath. This embodiment of the system of FIGS. 1-2 can provide a reduction in electrical requirements for peak performance of up to 144 kW of power—(5 ton HVAC unit, 100 amp 480 VAC service), a reduction of 63 tons of carbon emissions at the local site (based on the above data), and full use of the production facility regardless of outside ambient conditions (day/night operations).

Figure 3:
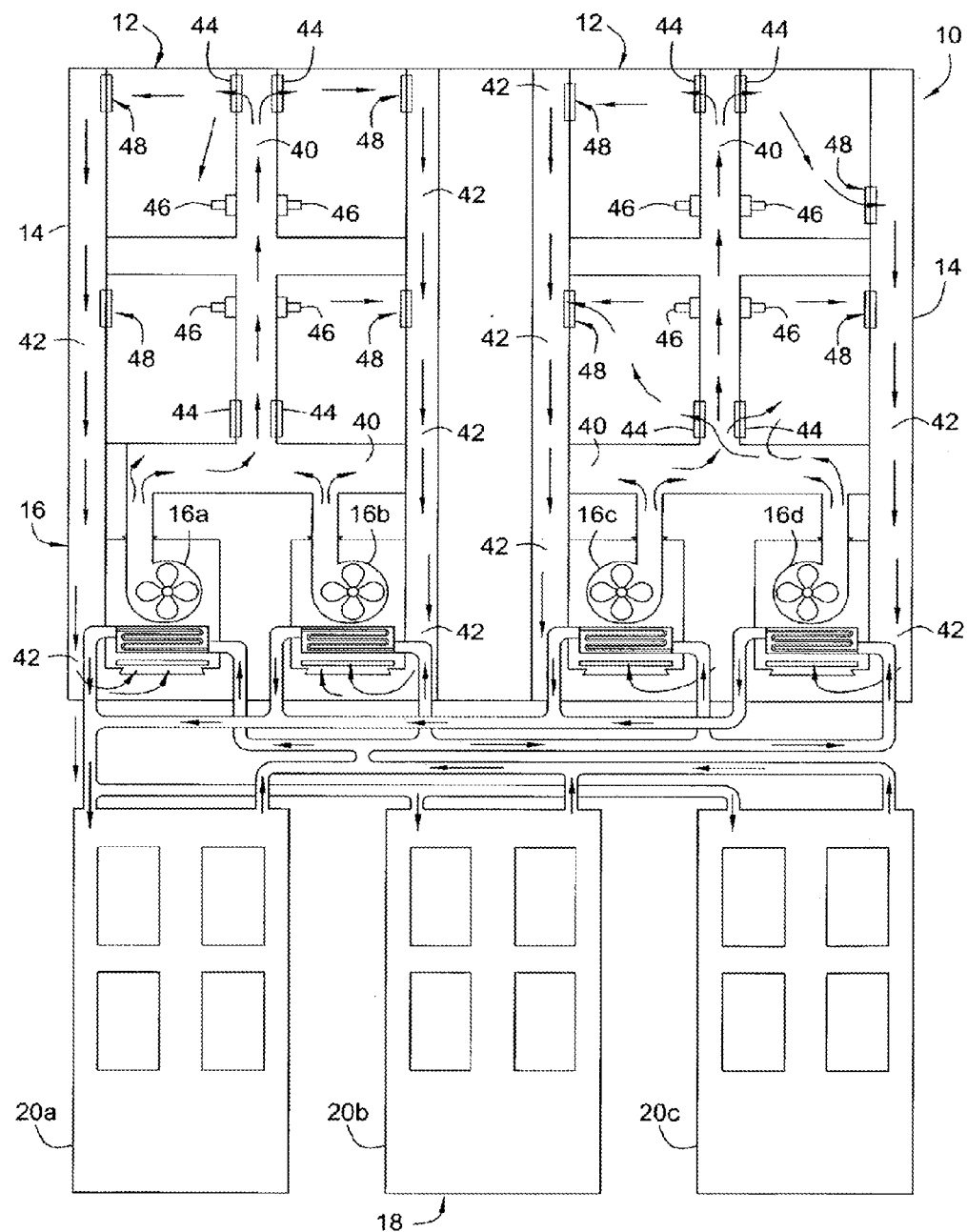
FIG. 3 shows an exemplary block diagram of an air conditioned multi-building facility.

One or more expanders 20a can be used in a facility. The specific embodiment of an air conditioning system shown in FIG. 3 includes a duct system 14 associated with a building system 12 (two buildings in this example), an air handling system 16 that includes four separate air handling units (16a, 16b, 16c, 16d) and one or more environment expanders 20a, 20b, 20c (collectively environmental expander 18). The environmental expander 18 expands the performance of conventional heating, ventilating and air conditioning (HVAC) systems that are used in controlled environments. Through the use of a cryogenic element, removal of latent heat from the liquid in a vapor-compression or absorption refrigeration system is accomplished by using a combination of a vaporizer and sparging system fueled by a cryogenic element.

Figure 2B:
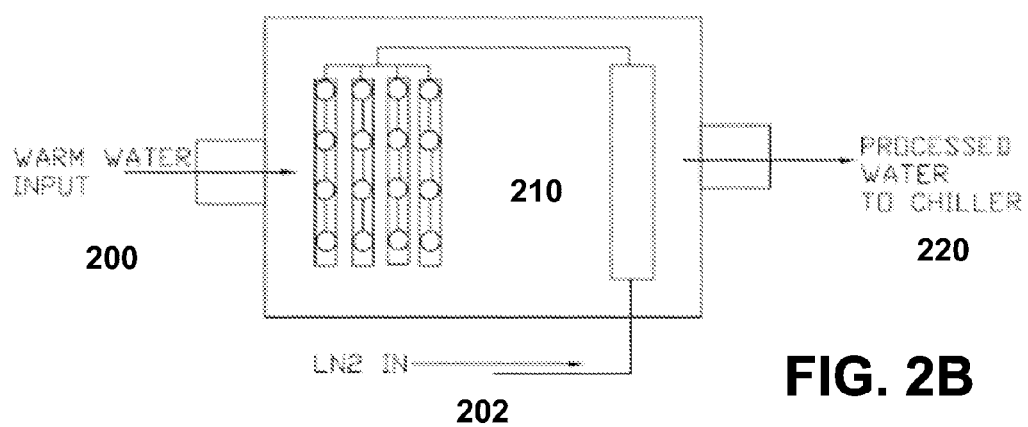
FIGS. 2B and 2C show details of one embodiment of a water chiller of an air conditioning system.
Figure 2C:
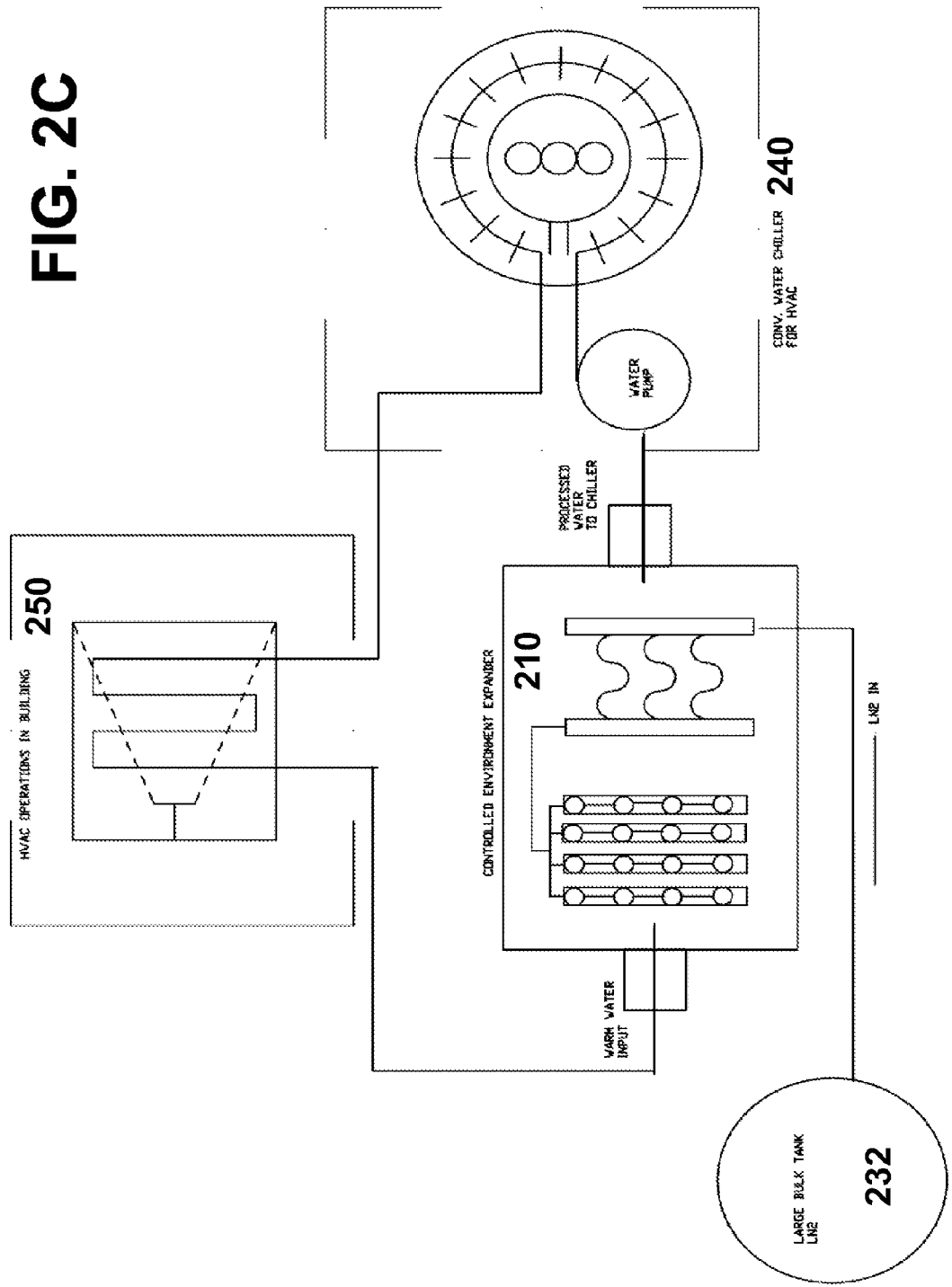

FIGS. 2B and 2C show details of one embodiment of a water chiller of an air conditioning system. Referring now to FIG. 2B, warm water is provided to an inlet 200 of a controlled environment expander 210. An LN2 input 202 is also provided to the expander 210. The chilled water is provided as an output 220.

FIG. 2C shows the system of FIG. 2B for conditioning air in a building. A large LN2 bulk tank 232 provides LN2 to the controlled environment expander 210. The expander 210 generates chilled water and provides to a converted water chiller 240. In one embodiment, the converted water chiller 240 includes a water pump that circulates the chilled water through vents or fins or suitable outputs in the converted water chiller 240 so that cooled air can be extracted therefrom to provide HVAC operations in a building 250. The chilled water is circulated through the building 250, eventually emerging as warm water which is then provided as an input to the controlled environment expander 210.

The air handling system can be any conventional air handling system or fan-coil unit. The air conditioning system shown in FIG. 3 includes a duct system 14, which includes a "duct," defined broadly herein in its broadest sense, as including any structure or collection of structures capable of directing air from one location to another location. The duct system preferably includes insulation (not shown), e.g., one or more layers of insulation, of a type and thickness sufficient to prevent heating of the air traveling through the duct system, particularly the "supply duct" (discussed below) that carries the low temperature air to the rooms. In at least one specific embodiment, a "duct" can be a longitudinal hollow housing typically constructed of sheet metal that either itself extends throughout a building, or is made up of a number of duct sections (each of which can be referred to as "ducts") placed end-to-end with one another. This duct network is normally located above the ceiling of the building but may also be located beneath the floor or outside the building or elsewhere. The duct system includes one or more supply ducts 40, each of which, generally speaking, contains air flowing away from the cooling coil. Some of the supply ducts directly supply cool air to individual rooms of the building. The duct system also preferably includes one or more "return ducts" 42, each of which, generally speaking, contains air flowing toward the cooling coil (although in a large building system, where the duct system is maze-like, the supply and return ducts may not direct air in a straight line away from or toward the cooling coils). In preferred embodiments, the supply ducts contain air that is moving, and has a low temperature, while the return ducts contain moving air that has a high temperature. The "low" and "high" temperatures may be the temperatures described above, but, at a minimum, those temperatures are relative to one another, so that the "high temperature air" is higher than the "low temperature air."

The duct system 14 can also includes individual room vents 44, e.g., diffusers, through which the cooled air (e.g., low temperature air) is preferably supplied to the various rooms throughout the large building system, so that the average temperature of the air in the various rooms is lowered as the cooled air mixes with the room air, i.e., the air already in the room.

An air temperature sensor 46 may be located in each room 48, or at least in one or more rooms of the building. An air temperature sensor may optionally be located in the supply air duct 40 to monitor the supply air temperature. Each temperature sensor may be in operable communication with one or more air or water flow controllers (not shown). Accordingly, based on the sensed temperature (of the room air or supply air), the flow controller may be activated to provide increased cooling of the air, or conversely be decreased to provide decreased cooling of the air. Alternatively, the air flow can be increased to provide increased cooling in the room, and the air flow can conversely be decreased to provide decreased cooling in the room. While discussed herein in terms of cooling of air or room, it should be recognized to one skilled in the art that the systems described herein can also be used for heating the air in a large building system.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cryogenic system to expand environmental support, comprising:

a. a heating, ventilating, and air conditioning (HVAC) system with an HVAC fluid circulating throughout, wherein the HVAC system controls room temperature;

b. a vaporizer coupled to a cryogenic supply tank to receive a cryogen; and c. a sparging unit coupled to the vaporizer with both fully immersed in the HVAC liquid to dispense and mix sparge bubbles, wherein the sparging unit receives the HVAC liquid prior to the vaporizer and comprises rows of tubing in a grid pattern with each tube exit point being at the bottom of the HVAC liquid.

2. The system of claim 1, wherein cryogen flow is based on a liquid bath temperature and an HVAC load.

3. The system of claim 1, comprising a supply line coupled to the vaporizer.

4. The system of claim 3, wherein the supply line comprises a vacuum insulated piping (VIP) line.

5. The system of claim 3, comprising a manual shut-off valve coupled to the supply line.

6. The system of claim 1, wherein the vaporizer comprises a multiple pass finned heat exchanger.

7. The system of claim 1, wherein the vaporizer comprises a multiple pass finned heat exchanger with stainless steel fins and tubes.

8. The system of claim 1, wherein the cryogen is proportionally flow controlled into the vaporizer based on real time expander data.

9. The system of claim 1, comprising equal length tubing to receive cryogen in a parallel fashion, introducing equal amounts of cryogen to all tubing.

10. The system of claim 1, comprising a controller with one or more setpoint limits so that when the return air temperature reaches a setpoint, a cryogen flow is started.

11. The system of claim 1, comprising a sensor to monitor the vaporizer temperature and to engage a defrost cycle.

12. A method to expand environmental support for an HVAC system with an HVAC fluid circulating throughout, comprising:

a. vaporizing a cryogen; and b. sparging the vaporized cryogen to dispense and mix sparge bubbles to the HVAC fluid, wherein the sparging unit receives the HVAC liquid prior to the vaporizer and comprises rows of tubing in a grid pattern with each tube exit point being at the bottom of the HVAC liquid.

13. The method of claim 12, wherein the vaporizing comprises a passing the cryogen through a multiple pass finned heat exchanger.

14. The method of claim 13, wherein the multiple pass finned heat exchanger comprises stainless steel fins and tubes.

15. The method of claim 12, wherein cryogen flow is based on a liquid bath temperature and an HVAC load.

16. The method of claim 12, comprising flowing the cryogen in a parallel fashion, introducing equal amounts of cryogen to all tubing.

* * * * *